June 3, 1930.  J. F. O'CONNOR  1,761,226
SHOCK ABSORBING MECHANISM FOR AUTOMOBILES
Filed March 5, 1927
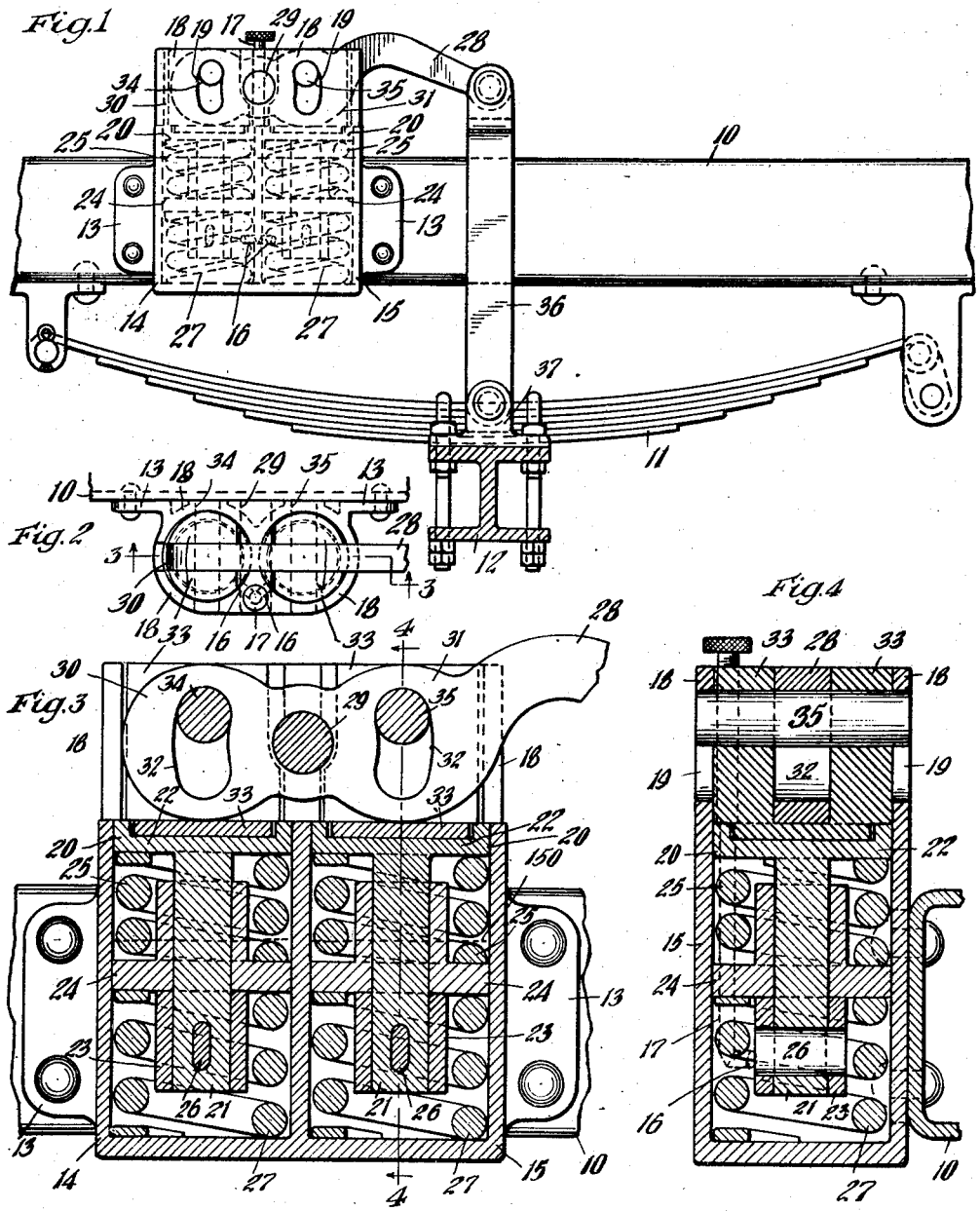
Witness
Wm. Geiger
Inventor
John F. O'Connor
By George I. Haight
His Atty.

Patented June 3, 1930

1,761,226

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK-ABSORBING MECHANISM FOR AUTOMOBILES

Application filed March 5, 1927. Serial No. 172,940.

This invention relates to shock absorbing mechanisms for automobiles.

An object of the invention is to provide a shock absorbing mechanism to be used in connection with motor vehicles, especially of the bus type and adapted to be associated therewith in such manner as to be operable by the relative movement between the usual axle and the chassis of the vehicle, and aid the usual springs which support the axle in absorbing shocks transmitted thereto through inequalities in the roadway.

Another object of the invention is to provide a mechanism of this character which affords resistance to the relative movement between the axle and chassis of the vehicle, and wherein means are secured to the chassis which include a plurality of fluid containing cylinders utilized in conjunction with a plurality of pistons, together with an actuating element connected with the axle for actuating the pistons whereby fluid in one of the cylinders is forced through a restricted opening into the other cylinder when the actuating element moves in one direction, and is forced from the other cylinder back into the first cylinder when said actuating element moves in the reverse direction.

A still further object of the invention is to provide a compound piston arrangement for forcing the fluid from one cylinder to the other, wherein the operative parts of the piston are relatively movable during the operative stroke so that the pressure initially built up upon reaching an undesirable amount is yieldably relieved by relative movement between the parts composing the piston arrangement.

Other and further objects of the invention will more clearly appear from the description and claims hereinafter following.

In the drawings forming part of this specification, Figure 1 is a side elevational view of a portion of the chassis of an automobile, the usual spring assembly connected to an axle, and showing the invention applied in operative position in connection therewith. Figure 2 is a fragmentary plan view of the invention as shown in Figure 1. Figure 3 is an enlarged vertical sectional view of the invention taken through the housing thereof substantially on the line 3—3 of Figure 2, and showing the interior construction thereof. And Figure 4 is a vertical transverse sectional view taken substantially on the line 4—4 of Figure 3.

As shown in the drawings, 10 represents a fragment of the side frame forming a part of the chassis of an automobile; 11 represents a spring assembly attached to the frame member in the usual manner; and 12 denotes an axle member carried by the spring assembly 11.

In carrying out the invention there is provided a housing having flanges 13—13 thereon by which the housing is secured to the frame member 10. The housing is formed to provide two cylinders 14 and 15 adapted to contain liquid, the level of which is indicated at 150, said cylinders communicating by means of ports 16—16 adjustably controlled by means of a needle valve 17 which is adjustably mounted in the portions of the housing hereinafter more particularly referred to. The upper portions of the cylinders are provided with arcuate extensions 18—18, said extensions being provided with a pair of arcuate slots 19—19 at each side of the housing for the reception of portions of the actuating mechanism hereinafter referred to.

Mounted in the cylinders are compound pistons or plungers 20—20, which are exactly alike in construction, and consequently only one of the same will be described in detail. Each of the pistons 20 comprises a relatively heavy stem 21, and a disc-shaped portion 22. Mounted on the stem is a sleeve member 23, said sleeve being secured to the lower end of the stem 21 by a key 26, the sleeve and the lower end of the stem forming the effective diameter of the piston head in displacing the fluid upon downward movement of the stem 21. Slidably mounted upon the stem 21, between the sleeve or ring 23 and the disk 22, is a flanged member 24 having a boss thereon which forms a stop to limit approach of the disk 22 and the flanged member 24. Interposed between the disc 22, and the flange member 24 is a heavy coiled spring 25, which is placed under considerable initial compression and bears upon the under surface of the disk 22 and the flange of the member 24. Mounted in each cylinder is a second spring 27, the bottom end of which bears upon the bottom wall of the cylinder while the upper end bears upon the under-surface of the flange of the member 24, the spring 27 being normally held under some initial pressure which aids in releasing the device as hereinafter referred to.

The actuating mechanism of the device includes the lever member 28, said lever being pivotally mounted in the housing by means of a pivot pin 29, said lever being provided with spaced actuating portions 30 and 31, each of which is provided with an arcuate slot 32. The central pivot pin 29 extends through the extension walls 18—18 as best shown in Figure 2, being inserted from the outer side of the housing through an opening in the lever 28 between the slots 32—32. The pin 29 is held in operative position by means of the upper portion of the needle valve 17 which extends through the outer end of the pin 29. The pistons 20—20 are operated through the medium of U-shaped transmitting members 33—33, each of which has its legs disposed at opposite sides of one of the portions 30 and 31, said transmitting members being maintained in operative position by pins 34 and 35 each extending through the adjacent pair of slots 19—19 of the housing, through circular apertures in the adjacent legs of the transmitting member 33, and through one of the slots 32—32 in the actuating portions 30 and 31 of the lever 28. The outer free end of the lever 28 is pivotally connected to a link 36. The link is pivotally connected to a bracket 37 secured to the axle 12.

In operation, assuming that the vehicle strikes an obstruction in the road so as to cause movement of the axle member 12 toward the chassis 10, the link 36 will be forced in an upward direction, swinging the lever 28 in a counter-clockwise direction about the pivot pin 29, which will result in depression of the actuating portion 30 of the lever which carries the pin 34 therewith as permitted by the slots 19—19, bringing about downward movement of the adjacent transmitting member 33. The movement of the transmitting member 33 is communicated to the disk 22, stem 21 and sleeve 23, the member 24 being held in balanced position by the springs 25 and 27, and the lower end of the stem 21 and ring or sleeve 23 displace the fluid in the cylinder and cause it to flow through the ports and to back up against the flange of the member 24, upward movement of the latter being resisted by the spring 25 until such time as the pressure built up during the operative stroke is relieved by yielding relative movement of the member 24 upwardly along the stem 21 against the pressure exerted by the spring 25. The size of the ducts 16—16 may be varied by adjustment of the needle valve 17. Assuming separation of the axle 12 with reference to the chassis member 10, the link 36 will be actuated in a downward direction bringing about clockwise movement of the lever 28 about the pivot 29. This will result in depression of the piston in the right-hand cylinder as viewed in the various figures, bringing about action similar to that before described in detail. Upward movement of either of the pistons is limited by the transmitting member 33 associated therewith which forms a stop due to either the pin 34 or 35 coming into contact with the walls of the slots 32—32 of the lever.

By above described arrangement, it will be appreciated that no stuffing boxes are necessary, and further in the operation of the device a combined resilient and fluid resistance is offered to either separation or approach of the axle member 12 and the chassis member 10, and during the operation of the device one of the cylinders acts as a reservoir to accommodate the fluid displaced from the cylinder which is operating and there is no necessity for the provision of an intricate system of valves; further, the compound piston arrangement is such as to provide a yieldable combined resilient and fluid resistance to compensate for the differences in the severity of the shocks which are absorbed avoiding injury to the device.

While I have herein shown and described what I consider the preferred manner of carrying out the invention, the same is merely illustrative, and I contemplate all changes and modifications which come within the scope of the claims appended hereto.

I claim:

1. In a device of the character described, the combination with relatively movable members of a vehicle; of a plurality of cylinders connected to one of said members and adapted to contain liquid, said cylinders communicating by means of a port; of a plurality of pistons, one of which is disposed in each of said cylinders, each of said pistons comprising a compound construction having a plurality of fluid displacing surfaces, one of which is mounted to yield under predetermined pressure; and actuating means connected with the other of said members of said vehicle and adapted to alternately operate said pistons dependent upon the direction of movement of said actuating means.

2. In a device of the character described, the combination with a plurality of cylinders adapted to contain liquid, said cylinders being in communication by means of a port; a piston for each of said cylinders each including a plurality of fluid displacing surfaces, one of which is yieldable upon encountering predetermined resistance, and means for alternately actuating said pistons whereby the fluid is driven by the actuating piston from one cylinder into the other cylinder.

3. In a device of the character described, the combination with the frame member of a vehicle and an axle member of said vehicle; of a housing including a plurality of cylinders secured to said frame member, said housing being provided with extensions having spaced slots therein, said cylinders containing liquid and communicating by means of a port; means for adjusting the size of said port; a piston in each of said cylinders; a lever pivotally connected to said housing adjacent one end and provided with spaced slots arranged at opposite sides of the pivotal connection of said lever; transmitting members, one of which co-operates with each of said pistons; and elements extending through the slots in said lever, being rotatably connected with said transmitting members, and extending through the slots in the extensions on said housing; and means connecting the free end of said lever with said axle member.

4. In a device of the character described, the combination with the frame member of a vehicle and an axle member of said vehicle; of a housing including a plurality of cylinders secured to said frame member, said housing being provided with extensions having spaced slots therein, said cylinders containing liquid and communicating by means of a port; means for adjusting the size of said port; a piston in each of said cylinders, each piston including elements providing a plurality of relatively movable fluid displacing surfaces, one of which is yieldable upon encountering predetermined pressure; a lever pivotally connected to said housing adjacent one end and provided with spaced slots arranged at opposite sides of the pivotal connection of said lever; transmitting members, one of which co-operates with each of said pistons; and elements extending through the slots in said lever, being rotatably connected with said transmitting members, and extending through the slots in the extensions on said housing; and means connecting the free end of said lever with said axle member.

5. In a shock absorbing means for vehicles, interposed between the vehicle frame and one of the axle members of said vehicle, the combination with a pair of cylinders fixed to said frame, said cylinders being in communication to permit flow of fluid from one to the other; of a piston within each cylinder, each of said pistons being provided with a member presenting a fluid displacing surface, said member being movable to a limited extent toward said piston; means for yieldingly opposing relative movement of said piston and member toward each other; means actuated upon relative movement of said axle and frame for independently actuating said pistons in the same direction and through the yielding means actuate said members provided with the fluid-displacing surfaces to force the fluid from one cylinder to the other, one of said pistons being actuated upon relative approach of the axle and frame, and the other piston being actuated upon relative separation of said axle and frame.

6. In a device of the character described, the combination with relatively movable members of a vehicle; of means connected to one of said vehicle members including a plurality of fluid cylinders, each of which is provided with a piston member; means for retarding movement of said piston members in one direction including fluid means; means for limiting movement of each of said pistons in the opposite direction; an actuating element connected to the other vehicle member and arranged to operate in said first named direction either of said piston members, depending upon the direction of movement of said actuating member, while the other piston member is held stationary by said limiting means; and a port establishing communication between said cylinders.

7. In a device of the character described, the combination with relatively movable members of a vehicle; of a plurality of fluid cylinders secured to one of said members, said cylinders having a communicating port; a plunger co-operating with each cylinder; pistons in said cylinders movable with respect to the plungers; spring means opposing movement of the pistons toward said plungers; actuating means connected to the other of said vehicle members adapted to actuate one or the other of said plungers in one direction, depending upon the direction of movement of said actuating means and through the interposed spring actuating the corresponding piston, whereby the fluid in one of the cylinders is transferred through said port to the other of said cylinders to actuate the piston in the last named cylinder in a direction reverse to that imparted by the actuating means and against said spring means; and stop means for limiting the movement of said plunger in said last named direction and holding the same stationary while the other plunger is actuated.

8. In a device of the character described, including a cylinder having fluid therein and provided wtih a port through which said fluid is adapted to be driven; of a piston for said cylinder, comprising a plurality of liquid-tight fluid-displacing members, one of which is movable relatively to the other to yield under predetermined pressure in said cylinder; yielding means opposing relative movement of said displacing members; and actuating means for operating said piston, actuating one of said members directly and the other through the yielding means for driving said fluid through said port.

9. In a device of the character described, the combination with a cylinder adapted to contain a fluid; of a compound piston including elements providing a plurality of cooperating liquid-tight fluid-displacing surfaces; means for actuating said compound piston in one direction to force the fluid out of the cylinder; means for connecting said elements for relative movement; yielding means opposing relative movement of said elements in a direction opposite to the direction of movement of the piston, whereby one of said surfaces will yield with respect to the other upon encountering a predetermined resistance in said cylinder.

In witness that I claim the foregoing I have hereunto described my name this 2nd day of March, 1927.

JOHN F. O'CONNOR.